Patented Nov. 3, 1925.

1,559,600

UNITED STATES PATENT OFFICE.

VICTOR WINTSCH, JR., OF ZURICH, SWITZERLAND, ASSIGNOR TO R. H. COMEY COMPANY, OF CAMDEN, NEW JERSEY, A CORPORATION OF NEW JERSEY.

STABILIZER FOR SOLUTIONS CONTAINING LOOSELY-COMBINED OXYGEN AND PROCESS OF MAKING THE SAME.

No Drawing. Application filed June 25, 1924. Serial No. 722,416.

*To all whom it may concern:*

Be it known that I, VICTOR WINTSCH, Jr., a citizen of the Swiss Confederation, residing at Bachtoldstrasse 7, Zurich, Switzerland, have invented new and useful Improvements in Stabilizers for Solutions Containing Loosely-Combined Oxygen and Processes of Making the Same, of which the following is a specification.

The manufacture of many stabilizers is known, in the most part they consist of simple salts, of which a well known one, as recommended by Dr. Sarason in U. S. A. Letters Patent 1,000,298, is sodium pyrophosphate.

After having carried out exhaustive experiments I state, that I have found out by dissolving sodium pyrophosphate in salicylic acid on the water bath, continuing the heating until dryness has been obtained, a compound of new and surprising properties which is sodium pyrophosphate salicylate and may perhaps have the formula:

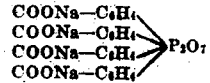

or it may have the formula that corresponds to any one of the intermediate products wherein one, two or three of the sodium atoms remain associated with the pyrophosphate group or a mixture of such products, or more probably,

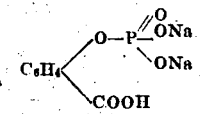

As a specific example, but without limiting the invention thereto, I may state that I may mix 446.4 parts of sodium pyrophosphate in 276.2 parts of salicylic acid moistened with water, on a water bath and heat to dryness as set forth above.

Such a compound has a stabilizing power on solutions containing loosely combined oxygen for example, hydrogen peroxid, sodium peroxid, sodium perborate, sodium percarbonate, and the like, especially at temperatures over 75° C. that can not be obtained with pyrophosphate of sodium alone or salicylic acid alone or with any other products known at this time.

This compound is practical because of its solubility in water, whereas salicylic acid alone is difficultly soluble in water. Also sodium pyrophosphate has been mentioned as an example. I wish it understood that potassium and similar pyrophosphates may be used.

By the expression "pyrophosphate salicylate" as used herein and in the appended claims, I include such materials as are prepared according to the process set forth above, as well as materials substantially identical therewith, no matter how prepared.

Having thus described my invention, I claim as new:

1. A stabilizer for permitting of only slow liberation of oxygen in solutions containing loosely combined oxygen consisting of a soluble pyrophosphate salicylate.

2. A stabilizer for permitting of only slow liberation of oxygen in solutions containing loosely combined oxygen consisting of an alkali metal pyrophosphate salicylate.

3. A stabilizer for permitting of only slow liberation of oxygen in solutions containing loosely combined oxygen consisting of sodium pyrophosphate salicylate.

4. The process of making a stabilizer of the class described which comprises mixing sodium pyrophosphate in salicylic acid and heating to dryness on a water bath.

5. The process of making a stabilizer of the class described which comprises mixing 446.4 parts of sodium pyrophosphate in 276.2 parts of salicylic acid and heating to dryness on a water bath.

6. A stabilizer for permitting of only slow liberation of oxygen in solutions containing loosely combined oxygen produced by mixing sodium pyrophosphate and salicylic acid and heating said mixture to dryness on a water bath.

In testimony whereof I have signed my name to this specification.

VICTOR WINTSCH, JR.